UNITED STATES PATENT OFFICE.

EMILE DE MEULEMEESTER, OF BRUSSELS, BELGIUM, ASSIGNOR TO FORCE SOCIÉTÉ ANONYME, OF ANTWERP, BELGIUM.

PROCESS OF PRESERVING BUTTER.

SPECIFICATION forming part of Letters Patent No. 689,292, dated December 17, 1901.

Application filed August 23, 1901. Serial No. 73,058. (No specimens.)

*To all whom it may concern:*

Be it known that I, EMILE DE MEULEMEESTER, gentleman, a subject of the King of Belgium, residing at 62 Rue de Neuchatel, Brussels, in the Kingdom of Belgium, have invented an Improved Process of Preserving Butter, of which the following is a specification.

This invention relates to a process for preserving butter, which is based upon the property possessed by gum-arabic of rendering the water or the milk contained in butter non-fermentable.

The researches of Fehling have established the fact that gum-arabic and its concentrated solutions are not fermentable, and numerous experiments which I have made have demonstrated that by mixing powdered gum-arabic with butter in the requisite proportions for absorbing the water contained in the latter (about four per cent.) the butter may be kept for a long period without becoming rancid. In addition to this with a small admixture of salt the butter preserves its aroma. Nevertheless this method of procedure presents the disadvantage that it necessitates too large a proportion of gum-arabic and that this gum should be exempt from impurities. Now it is difficult to procure pure gum in large quantities, and its price would speedily become prohibitive if the consumption became large. In order to obviate these disadvantages, I proceed in the following manner: I dissolve raw gum-arabic in water and filter the solution in order to remove impurities—such as fragments of bark, dust, &c.—contained in the gum. I then mix the filtered solution with the butter and finally extract the excess of liquid contained in the mixture. By way of example I will describe a method of carrying my invention into practice which has given the desired result.

Raw gum-arabic is dissolved in water in the proportion of one part, by weight, of gum for two parts of water, and the solution is filtered in a filter-press, the frames of which are provided with a fabric sufficiently close for retaining the dust mixed with the gum. This solution is mixed with the butter, in the proportion of about six to ten liters of solution for one hundred kilograms of butter, in a suitable mixing-machine, and when the mixture has become thoroughly intimate it is caused to pass between two hollow cylinders arranged in juxtaposition and rotating in opposite directions. The surface of these cylinders is perforated in order to permit the liquid expressed from the mixture to escape. The cylinders are covered with a permeable fabric, so as to prevent the butter from entering these perforations. As butter ordinarily contains from ten to fifteen per cent. of water, this proportion is raised to sixteen to twenty-two per cent. by the addition of the gum-arabic solution, and this excess of water is readily removed by causing the butter to pass once or twice between the pressing-cylinders. Operating in this manner, a portion of the gum-arabic is removed with the water, and the proportion of gum remaining in the butter may readily be reduced to one per cent. as against the proportion of four per cent. given by the method of treating butter with gum-arabic in powder. Before mixing with the butter the filtered solution of gum-arabic there is added to this latter the quantity of salt necessary for imparting to the butter the degree of saltness which it is desired to obtain. I have found that an addition of salt in the proportion of one-half to one part per one hundred parts of butter has the property of preserving the aroma of this latter when it is treated with gum-arabic in accordance with this invention.

I do not limit myself to a particular form of apparatus for carrying my invention into practice nor to the proportions of the various ingredients which have been given by way of example; but

What I claim as my invention is—

1. A process for the preservation of butter consisting in dissolving gum-arabic in water, in eliminating from this solution the impurities originally contained in the gum, in mixing this solution with the butter to be treated, then in removing from the mixture a portion of the water originally contained in the butter and a portion of the gum-arabic solution which has been added to the butter substantially as described.

2. A process for the preservation of butter consisting in preparing a solution of gum-arabic in water in the proportion of one part by weight of gum for two parts of water, in filtering this solution, in mixing the butter to be treated with this solution in the proportion of six to ten liters of the solution for one hundred kilograms of butter and in submitting the mixture to pressure in order to express a portion of the water originally contained in the butter and also a portion of the gum-arabic solution which has been mixed therewith substantially as hereinbefore described.

In testimony whereof I have hereunto set my hand, in presence of two subscribing witnesses, this 9th day of August, 1901.

EMILE DE MEULEMEESTER.

Witnesses:
H. J. E. KIRKPATRICK,
GREGORY PHELAN.